Jan. 21, 1941.   H. J. BUETTNER   2,229,369
FISH LURE
Filed Nov. 8, 1938
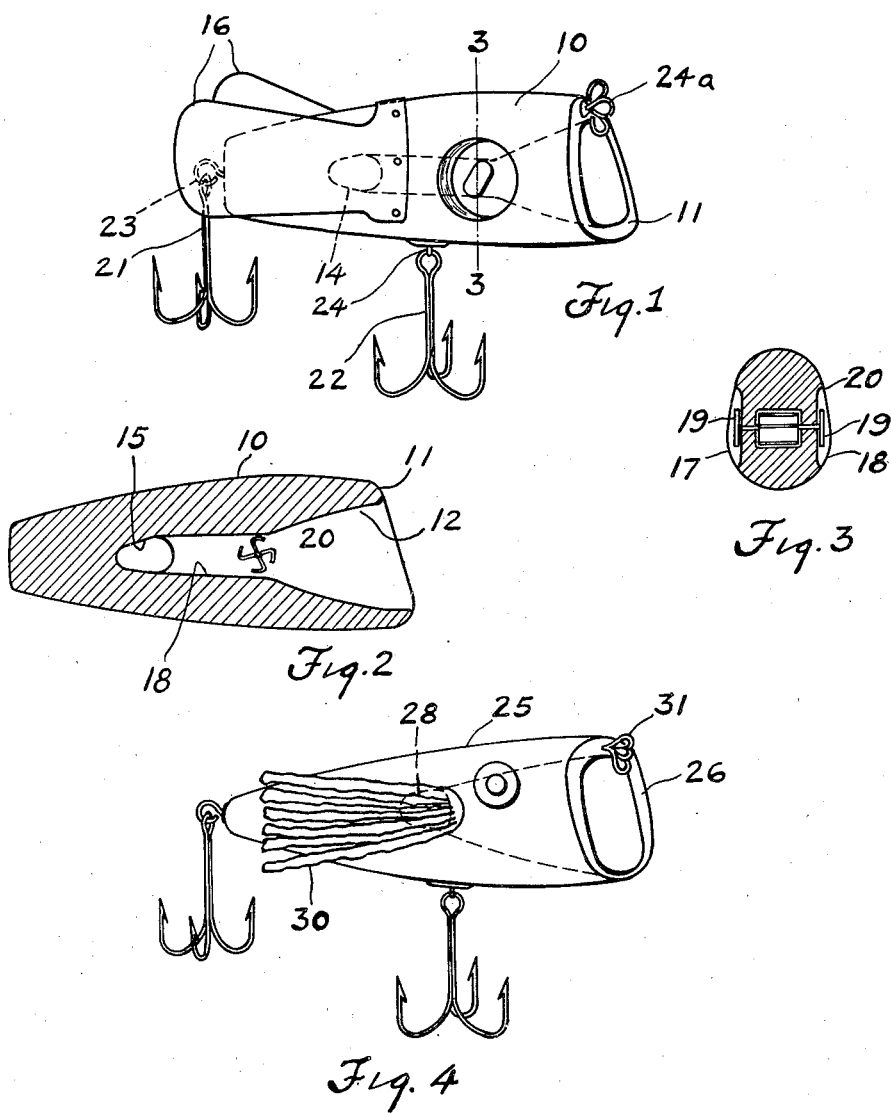
INVENTOR.
HENRY J. BUETTNER
BY Gerald P. Welch
ATTORNEY.

Patented Jan. 21, 1941

2,229,369

UNITED STATES PATENT OFFICE 2,229,369

FISH LURE

Henry J. Buettner, Milwaukee, Wis.

Application November 8, 1938, Serial No. 239,539

3 Claims. (Cl. 43—46)

This invention relates to improvements in fish lures, and more particularly to a novel fish lure utilizing the passage of water therethrough to produce a startling and natural effect.

An object of the invention is to produce a device of the type which will have flexible fins and means therein for causing movement of said fins by water pressure.

Another object of the invention is to provide a device of the type which will have eyes rotatable by water passing through the body thereof.

Other and further objects of the invention will appear as the description proceeds, reference being had to the accompanying drawing, in which:

Fig. 1 is a view in perspective of a fish lure embodying my invention.

Fig. 2 is a vertical sectional view of the device showing the water wheel employed therein.

Fig. 3 is a vertical section on line 3—3 of Fig. 1.

Fig. 4 is a view in perspective of a modified form of the invention.

Referring more particularly to the drawing, the numeral 10 represents the device generally. The frontal portion 11 of the lure 10 is hollowed as at 12 thereof in a conical form communicating with the longitudinal bore 13, which latter terminates in two side openings, as at 14 and 15 thereof. A pair of leather fins, 16, overlap the apertures as shown. The fins may be in one piece or in strands as shown in Fig. 4, and may be of any suitable material.

The sides of the lure toward the head 11 thereof, are recessed as at 17 and 18 to accommodate a pair of rotating eyes 19 which are turnable by means of the water wheel 20 pivoted at the head of bore 13. Conventional hook gangs 21 and 22 are swingably attached at 23 and 24 of the lure.

In the form shown in Fig. 4, the lure 25 is open at the forward end 26, and has a conical bore at 27, terminating in side apertures 28 and 29 (not shown). The fins 30 are stranded, and a triple lead 31 is provided.

In use, the lure shown in Fig. 1 may be fastened by the triple lead 24a to a line. If the line is attached to the uppermost opening of the lead, the lure will have a tendency to follow deep in the water. If attached by the lowermost lead, the lure will float high, and if attached by the central loop of the lead, it will tend to keep an even path straight through the water.

It will readily be understood that the water in passing through the bore 13 will turn the water wheel 20 and its related rotatable eyes 19. Also it will be seen that the water in leaving the apertures 14 and 15 will impart movement to the fins 16.

In use of the form shown in Fig. 4, it will be understood that the water on leaving the body of the lure 25 by means of the apertures 28 and 29 will impart movement to the fin strands 30.

It will be understood that the device is capable of many modifications in structure and design, without departing from the spirit of the invention, within the scope of the appended claims.

Having thus described the invention, what is claimed and desired to be secured by Letters Patent of the United States, is:

1. A fish lure open at the front end and having a bore for a portion of its length terminating in side apertures, a water wheel turnable in said bore, and exteriorly visible members positively connected with said water wheel.

2. A fish lure open at the front end thereof and having a bore for a portion of its length terminating in side apertures, and fins fastened to said lure and overlapping the apertures so that water entering the front end of the lure will be expelled through the apertures to actuate the fins.

3. A fish lure open at the front end thereof and having a cone shaped bore for a portion of its length terminating in oppositely disposed side apertures, and a plurality of flexible strands attached to the sides of the lure forwardly and adjacent to said side apertures whereby the movement of water through the lure will activate said strands.

HENRY J. BUETTNER.